US 12,304,469 B2

United States Patent
Fukuchi et al.

(10) Patent No.: US 12,304,469 B2
(45) Date of Patent: May 20, 2025

(54) DRIVING ASSISTANCE DEVICE, DRIVING ASSISTANCE METHOD, AND PROGRAM

(71) Applicant: TOYOTA JIDOSHA KABUSHIKI KAISHA, Toyota (JP)

(72) Inventors: Nobuaki Fukuchi, Numazu (JP); Daiki Yasui, Atsugi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 323 days.

(21) Appl. No.: 18/166,778

(22) Filed: Feb. 9, 2023

(65) Prior Publication Data

US 2023/0278551 A1 Sep. 7, 2023

(30) Foreign Application Priority Data

Mar. 7, 2022 (JP) ................................. 2022-034399

(51) Int. Cl.
*B60W 30/09* (2012.01)
*B60W 10/20* (2006.01)
*B60W 30/095* (2012.01)

(52) U.S. Cl.
CPC ............ *B60W 30/09* (2013.01); *B60W 10/20* (2013.01); *B60W 30/0956* (2013.01); *B60W 2554/4041* (2020.02)

(58) Field of Classification Search
CPC .. B60W 30/09; B60W 30/0956; B60W 10/20; B60W 2554/4041
See application file for complete search history.

(56) References Cited

U.S. PATENT DOCUMENTS

| 9,105,190 B2 | 8/2015 | Akiyama |
| 9,393,960 B2 | 7/2016 | Kodaira |
| 9,483,945 B2 | 11/2016 | Okita et al. |
| 9,873,412 B2 | 1/2018 | Moriizumi |
| 10,793,147 B2 | 10/2020 | Kaminade et al. |
| 2010/0191423 A1* | 7/2010 | Koyama ............... B60W 30/09 701/42 |
| 2018/0162335 A1* | 6/2018 | Hwang ................. B60W 10/08 |
| 2021/0061309 A1 | 3/2021 | Kawanai |

(Continued)

FOREIGN PATENT DOCUMENTS

| JP | 2005-007990 A | 1/2005 | |
| JP | 2009096349 A * | 5/2009 | .......... B60W 10/184 |
| JP | 2021-95021 A | 6/2021 | |

*Primary Examiner* — George C Jin
(74) *Attorney, Agent, or Firm* — Sughrue Mion, PLLC

(57) ABSTRACT

A driving assistance device (1) executes collision avoidance control of controlling a steering angle (θs) so that an own vehicle (100) travels along a target trajectory (Rt) which enables the own vehicle (100) to avoid collision with an obstacle (OB) without deviating from a traveling lane (LA1). The driving assistance device (1) includes: a steering control unit (10, 60) which executes, in order to avoid the collision, first steering control of increasing the steering angle (θs), and executes second steering control of reducing the steering angle (θs) in order to prevent the deviation from the traveling lane (LA1); and a damping control unit (10, 60) which executes damping control of applying a steering resistive force calculated based on a steering angle speed (dθs/dt) to a steered wheel. The damping control unit (10, 60) executes the damping control during the execution of the second steering control.

4 Claims, 9 Drawing Sheets

(56) References Cited

U.S. PATENT DOCUMENTS

| | | |
|---|---|---|
| 2021/0107521 A1 | 4/2021 | Fujita et al. |
| 2021/0107528 A1 | 4/2021 | Fujita et al. |
| 2021/0146956 A1 | 5/2021 | Fujita et al. |
| 2021/0146958 A1 | 5/2021 | Tanaka et al. |
| 2022/0017080 A1* | 1/2022 | Moriya ................ B60W 30/09 |
| 2023/0278551 A1* | 9/2023 | Fukuchi ................ G08G 1/167 |

* cited by examiner

DRIVING ASSISTANCE DEVICE, DRIVING ASSISTANCE METHOD, AND PROGRAM

BACKGROUND OF THE INVENTION

1. Field of the Invention

The present disclosure relates to a driving assistance device, a driving assistance method, and a program, and relates to a technology of collision avoidance control of avoiding collision between an own vehicle and an obstacle.

2. Description of the Related Art

For example, in Japanese Patent Application Laid-open No. 2005-007990, there is disclosed a device which, in an electric power steering device installed in a vehicle, applies an assist torque in an incremental direction to a steering shaft when an incremental operation on a steering wheel by a driver is detected, and applies a damping torque for preventing an excessive decrement while applying an assist torque in a decremental direction to the steering shaft when a decremental operation on the steering wheel is detected.

There has been known, as a driving assistance device installed in a vehicle, a device which executes, when an obstacle which is highly likely to collide with an own vehicle is detected in front of the own vehicle, collision avoidance control of automatically controlling a steering angle of steered wheels of the own vehicle such that the collision with the obstacle is avoided. The collision avoidance control successively executes first steering control for avoiding the collision of the own vehicle with the obstacle, and then executes second steering control for preventing deviation of the own vehicle from a traveling lane. In the first steering control, incremental steering of increasing the steering angle is executed. In the second steering control, decremental steering of returning the steering angle incremented through the first steering control to a neutral position, incremental steering of increasing the steering angle from the neutral position toward an opposite direction of the steering direction of the first steering control, and decremental steering of returning again the steering angle to the neutral position are successively executed.

In the collision avoidance control, when a self-aligning torque toward the decremental direction acting on the steered wheels during the execution of the first steering control is added to the second steering control, an overshoot in which the incremental steering of the second steering control is excessive in steering angle is caused. In order to prevent this overshoot, it is considered to apply the damping torque to the collision avoidance control.

However, when the damping torque is applied to both of the first steering control and the second steering control, the steering angle becomes insufficient in the first steering control, and there occurs a problem in that the collision with the obstacle cannot effectively be avoided. Moreover, when the technology as described in Japanese Patent Application Laid-open No. 2005-007990 is applied to the collision avoidance control, the damping torque is applied to only the decremental steering in Japanese Patent Application Laid-open No. 2005-007990, and hence the damping torque cannot be applied to the incremental steering executed in the second steering control. Thus, there occurs a problem in that the overshoot cannot consequently be suppressed.

SUMMARY OF THE INVENTION

The present disclosure has been devised in order to solve the above-mentioned problem. That is, one object of the present disclosure is to effectively suppress an excess in steering angle in second steering control while effectively suppressing a deficiency in steering angle in first steering control.

According to at least one embodiment of the present disclosure, there is provided a driving assistance device (1) for executing collision avoidance control of controlling, when an obstacle (OB) which is highly likely to collide with an own vehicle (100) is detected in a region located on a front side and front lateral sides of the own vehicle (100), a steering angle ($\theta$s) of a steered wheel of the own vehicle (100) so that the own vehicle (100) travels along a target trajectory (Rt) which enables the own vehicle (100) to avoid the collision with the obstacle (OB) without deviating from a traveling lane (LA1), the driving assistance device including: a steering control unit (10, 60) configured to execute, in order to avoid the collision between the own vehicle (100) and the obstacle (OB), first steering control being incremental steering of increasing the steering angle ($\theta$s), and to execute second steering control including decremental steering of reducing the steering angle ($\theta$s) in order to prevent the deviation of the own vehicle (100) from the traveling lane (LA1) after the execution of the first steering control; and a damping control unit (10, 60) configured to execute damping control of calculating a steering resistive force based on a steering angle speed (d$\theta$s/dt) during the execution of the collision avoidance control, and applying the calculated steering resistive force to the steered wheel, wherein the damping control unit (10, 60) is configured to avoid executing the damping control during the execution of the first steering control, and to execute the damping control during the execution of the second steering control.

According to at least one embodiment of the present disclosure, there is provided a driving assistance method of executing collision avoidance control of controlling, when an obstacle (OB) which is highly likely to collide with an own vehicle (100) is detected in a region located on a front side and front lateral sides of the own vehicle (100), a steering angle ($\theta$s) of a steered wheel of the own vehicle (100) so that the own vehicle (100) travels along a target trajectory (Rt) which enables the own vehicle (100) to avoid the collision with the obstacle (OB) without deviating from a traveling lane (LA1), the driving assistance method including: executing, in order to avoid the collision between the own vehicle (100) and the obstacle (OB), first steering control being incremental steering of increasing the steering angle ($\theta$s), and executing second steering control including decremental steering of reducing the steering angle ($\theta$s) in order to prevent the deviation of the own vehicle (100) from the traveling lane (LA1) after the execution of the first steering control; executing damping control of calculating a steering resistive force based on a steering angle speed (d$\theta$s/dt) during the execution of the collision avoidance control, and applying the calculated steering resistive force to the steered wheel; and avoiding executing the damping control during the execution of the first steering control, and executing the damping control during the execution of the second steering control.

According to at least one embodiment of the present disclosure, there is provided a program for causing a computer of a driving assistance device (1) for executing collision avoidance control of controlling, when an obstacle (OB) which is highly likely to collide with an own vehicle (100) is detected in a region located on a front side and front lateral sides of the own vehicle (100), a steering angle ($\theta$s) of a steered wheel of the own vehicle (100) so that the own vehicle (100) travels along a target trajectory (Rt) which enables the own vehicle (100) to avoid the collision with the obstacle (OB) without deviating from a traveling lane (LA1), to execute the processes of: executing, in order to avoid the collision between the own vehicle (100) and the obstacle (OB), first steering control being incremental steering of increasing the steering angle (θs), and executing second steering control including decremental steering of reducing the steering angle (θs) in order to prevent the deviation of the own vehicle (100) from the traveling lane (LA1) after the execution of the first steering control; executing damping control of calculating a steering resistive force based on a steering angle speed (dθs/dt) during the execution of the collision avoidance control, and applying the calculated steering resistive force to the steered wheel; and avoiding executing the damping control during the execution of the first steering control and executing the damping control during the execution of the second steering control.

With the above-mentioned configuration, the damping control of applying the steering resistive force is not executed during the execution of the first steering control, and is executed during the execution of the second steering control. As a result, it is possible to reliably suppress the occurrence of the deficiency in steering angle due to the damping torque in the first steering control. Moreover, in the second steering control, the damping torque is applied toward the direction of canceling a self-aligning torque, thereby being capable of reliably suppressing overshoots of the control due to an excess in steering angle.

In another aspect of the present disclosure, the damping control unit (10, 60) is configured to start the damping control when the steering angle speed (dθs/dt) becomes equal to or higher than a predetermined threshold speed during the execution of the second steering control.

According to this aspect, the damping control is started after the steering angle speed (dθs/dt) reaches a speed equal to or higher than the predetermined threshold speed, thereby being capable of reliably preventing the damping torque from being applied before the second steering control responds. As a result, it is possible to effectively suppress deterioration of responsiveness of the second steering control.

In order to facilitate the understanding of the invention, in the above description, the constituent features of the invention corresponding to at least one embodiment of the present disclosure are suffixed in parentheses with reference symbols used in the at least one embodiment. However, the constituent features of the invention are not intended to be limited to those in the at least one embodiment as defined by the reference symbols.

DESCRIPTION OF THE EMBODIMENTS

Description is now given of a driving assistance device, a driving assistance method, and a program according to at least one embodiment of the present disclosure with reference to the drawings. Like components are denoted by like reference symbols and the same applies to the names and functions of those components. Thus, a detailed description of those components is not repeated.

[Overall Configuration]

Figure 1:
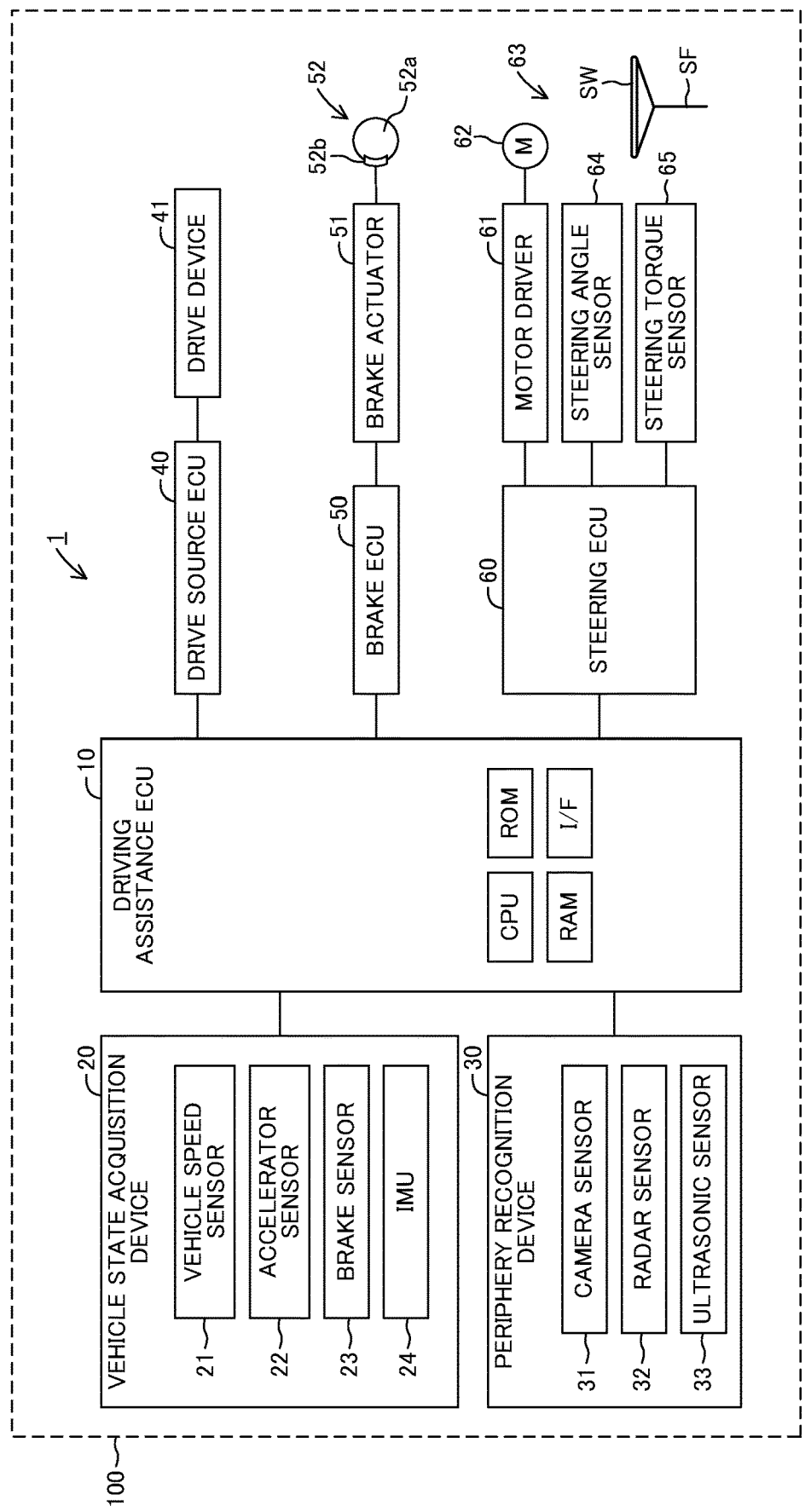
FIG. 1 is a schematic overall configuration diagram of a driving assistance device according to at least one embodiment of the present disclosure.

FIG. 1 is a schematic overall configuration diagram of a driving assistance device 1 according to the at least one embodiment. As illustrated in FIG. 1, the driving assistance device 1 is mounted to a vehicle 100. The vehicle 100 to which the driving assistance device 1 is mounted is hereinafter also referred to as "own vehicle" to distinguish this vehicle 100 from other vehicles. The driving assistance device 1 includes a driving assistance ECU 10, a drive source ECU 40, a brake ECU 50, and a steering ECU 60. Each of the ECUs 10, 40, 50, and 60 includes a microcomputer as a principal component, and is connected for mutual transmission and reception via a controller area network (CAN) (not shown). The term "ECU" is an abbreviation for "electronic control unit." The microcomputer includes a CPU, a ROM, a RAM, and an interface, for example, and the CPU implements various functions by executing instructions (programs, or routines) stored in the ROM. Some or all of the ECUs 10, 40, 50, and 60 may be integrated into one ECU to serve as a controller.

The driving assistance ECU 10 is a control device serving as a center of the execution of the driving assistance for a driver, and executes collision avoidance control in the at least one embodiment. The driving assistance ECU 10 is connected to a vehicle state acquisition device 20 and a periphery recognition device 30, and is configured to receive output signals and detection signals from those devices 20 and 30 each time a predetermined cycle elapses.

The vehicle state acquisition device 20 is sensors which acquire states of the vehicle 100. Specifically, the vehicle state acquisition device 20 includes a vehicle speed sensor 21, an accelerator sensor 22, a brake sensor 23, an internal measurement unit (IMU) 24, and the like.

The vehicle speed sensor 21 detects a travel speed of the vehicle 100 (vehicle speed "v"). The vehicle speed sensor 21 may be a wheel speed sensor. The accelerator sensor 22 detects an operation amount of an accelerator pedal (not shown) by a driver. The brake sensor 23 detects an operation amount of a brake pedal (not shown) by the driver. The IMU 24 detects an acceleration in each of a front-rear direction, a right-left direction, and an up-down direction of the vehicle 100 and an angular velocity in each of a roll direction, a pitch direction, and a yaw direction (yaw rate Yr) of the vehicle 100.

The periphery recognition device 30 is sensors which acquire target information on targets around the vehicle 100. Specifically, the periphery recognition device 30 includes a camera sensor 31, a radar sensor 32, an ultrasonic sensor 33, and the like.

The camera sensor 31 is, for example, a stereo camera or a monocular camera, and a digital camera including an image pickup element such as a CMOS or a CCD can be used as the sensor 31. The camera sensor 31 captures an image of a region located on a front side and front lateral sides of the vehicle 100, and processes captured image data, to thereby recognize road surface markings. The road surface markings include separation lines. The separation lines are lines marked on a road in order to partition travel of vehicles for each direction. The separation line includes a solid-line separation line and a broken-line separation line. In the at least one embodiment, a region between two separation lines next to each other and extending on a vehicle road is defined as a lane. The camera sensor 31 calculates a shape of the lane based on the recognized separation lines. Moreover, the camera sensor calculates presence or absence of a three-dimensional object in the region located on the front side and the front lateral sides of the own vehicle 100, a type of the three-dimensional object, and a relative relationship between the own vehicle 100 and the three-dimensional object based on the captured image data. The type of the three-dimensional object can be determined by analyzing the image data through use of a well-known pattern matching method.

The radar sensor 32 detects a target existing in a region located on the front side and the front lateral sides of the vehicle 100. The radar sensor 32 includes a millimeter wave radar or Lidar. The millimeter wave radar radiates a radio wave (millimeter wave) in a millimeter wave band, and receives the millimeter wave (reflected wave) reflected by a target existing within a radiation range. The millimeter wave radar acquires the relative distance between the vehicle 100 and the target, the relative speed between the vehicle 100 and the target, and the like based on a phase difference between the transmitted millimeter wave and the received reflected wave, an attenuation level of the reflected wave, a time from the transmission of the millimeter wave to the reception of the reflected wave, and the like. The Lidar sequentially scans laser light in a pulse form having a shorter wavelength than that of the millimeter wave in a plurality of directions, and receives reflected light reflected by a target, to thereby acquire a shape of the target detected in front of the vehicle 100, the relative distance between the vehicle 100 and the target, the relative speed between the vehicle 100 and the target, and the like.

The ultrasonic sensor 33 transmits an ultrasonic wave in a pulse form within a predetermined range in a periphery of the vehicle 100, and receives a reflected wave reflected by a three-dimensional object. The ultrasonic sensor 33 acquires target information indicating a reflected point being a point on the three-dimensional object on which the transmitted ultrasonic wave is reflected, a distance from the ultrasonic sensor 33, and the like based on a time from the transmission to the reception of the ultrasonic wave.

The drive source ECU 40 is connected to a drive device 41. The drive device 41 generates a driving force to be transmitted to driving wheels of the vehicle 100. As the drive device 41, for example, an electric motor and an engine are given. The vehicle 100 may be any one of an engine vehicle, a hybrid vehicle (HEV), a plug-in hybrid electric vehicle (PHEV), a fuel cell electric vehicle (FCEV), and a battery electric vehicle (BEV). The drive source ECU 40 sets a driver-requested driving torque based on an accelerator pedal operation amount acquired by the accelerator sensor 22 and the like, and controls the operation of the drive device 41 such that the drive device 41 outputs the driver-requested driving torque.

The brake ECU 50 is connected to a brake actuator 51. The brake actuator 51 is provided in a hydraulic circuit between a master cylinder (not shown) which pressurizes a hydraulic fluid through use of a stepping force on the brake pedal and a brake mechanism 52 provided to each wheel. The brake mechanism 52 includes a brake disc 52a fixed to the wheel and a brake caliper 52b fixed to a vehicle body. The brake mechanism 52 is not limited to the disc-type brake, and may be another brake mechanism such as a drum-type brake which applies a braking force to the wheel of the vehicle 100.

The brake actuator 51 adjusts a hydraulic pressure of the fluid supplied to a wheel cylinder integrated into the brake caliper 52b in response to an instruction from the brake ECU 50, and operates the wheel cylinder through this hydraulic pressure. As a result, the brake actuator 51 presses brake pads against the brake disc 52a, to thereby generate a frictional braking force. Thus, the brake ECU 50 can control a braking force of the vehicle 100 by controlling the brake actuator 51.

The steering ECU 60 is connected to a motor driver 61. The motor driver 61 is connected to a steering motor 62. The steering motor 62 is built into a steering device 63 including a steering wheel SW, a steering shaft SF, and the like. The steering device 63 may be any one of a rack-and-pinion type and a steer-by-wire type. The steering motor 62 generates a steering torque through use of electric power supplied from the motor driver 61. Right and left steered wheels of the vehicle 100 can be steered though use of this steering torque. That is, the steering motor 62 can change a steering angle of the vehicle 100 (steering angle of the steered wheels).

The steering ECU 60 is connected to a steering angle sensor 64 and a steering torque sensor 65. The steering angle sensor 64 detects a rotation angle of the steering wheel SW or the steering shaft SF, that is, an actual steering angle $\theta s$. The steering torque sensor 65 detects a rotational torque of the steering wheel SW or the steering shaft SF, that is, an actual steering torque Tq. The actual steering angle $\theta s$ and the actual steering torque Tq are defined so that, for example, the actual steering angle $\theta s$ and the actual steering torque Tq take positive values when steering toward a left turn direction of the vehicle 100 is executed and take negative values when steering toward a right turn direction of the vehicle 100 is executed.

The steering ECU 60 controls the drive of the steering motor 62 based on the actual steering angle $\theta s$ detected by the steering angle sensor 64, the actual steering torque Tq detected by the steering torque sensor 65, and the vehicle speed V detected by the vehicle speed sensor 21. The steering ECU 60 can apply a steering assist torque for assisting in a steering operation of the driver to the steering device 63 through use of the drive of this steering motor 62.

Moreover, when the steering ECU 60 receives a steering command from the driving assistance ECU 10 during the execution of the collision avoidance control, the steering ECU 60 drives the steering motor 62 via the motor driver 61 based on a target steering torque specified by this steering command. As a result, the steering ECU 60 generates the steering torque such that the steering torque matches the target steering torque. This steering torque is different from the above-mentioned steering assist torque, and is a torque applied to the steering device 63 based on the steering command from the driving assistance ECU 10. Thus, the driving assistance ECU 10 can automatically change the steering angle of the steered wheels of the vehicle 100 via the steering ECU 60 without requiring the steering operation of the driver during the execution of the collision avoidance control.

[Collision Avoidance Control]

Figure 2:
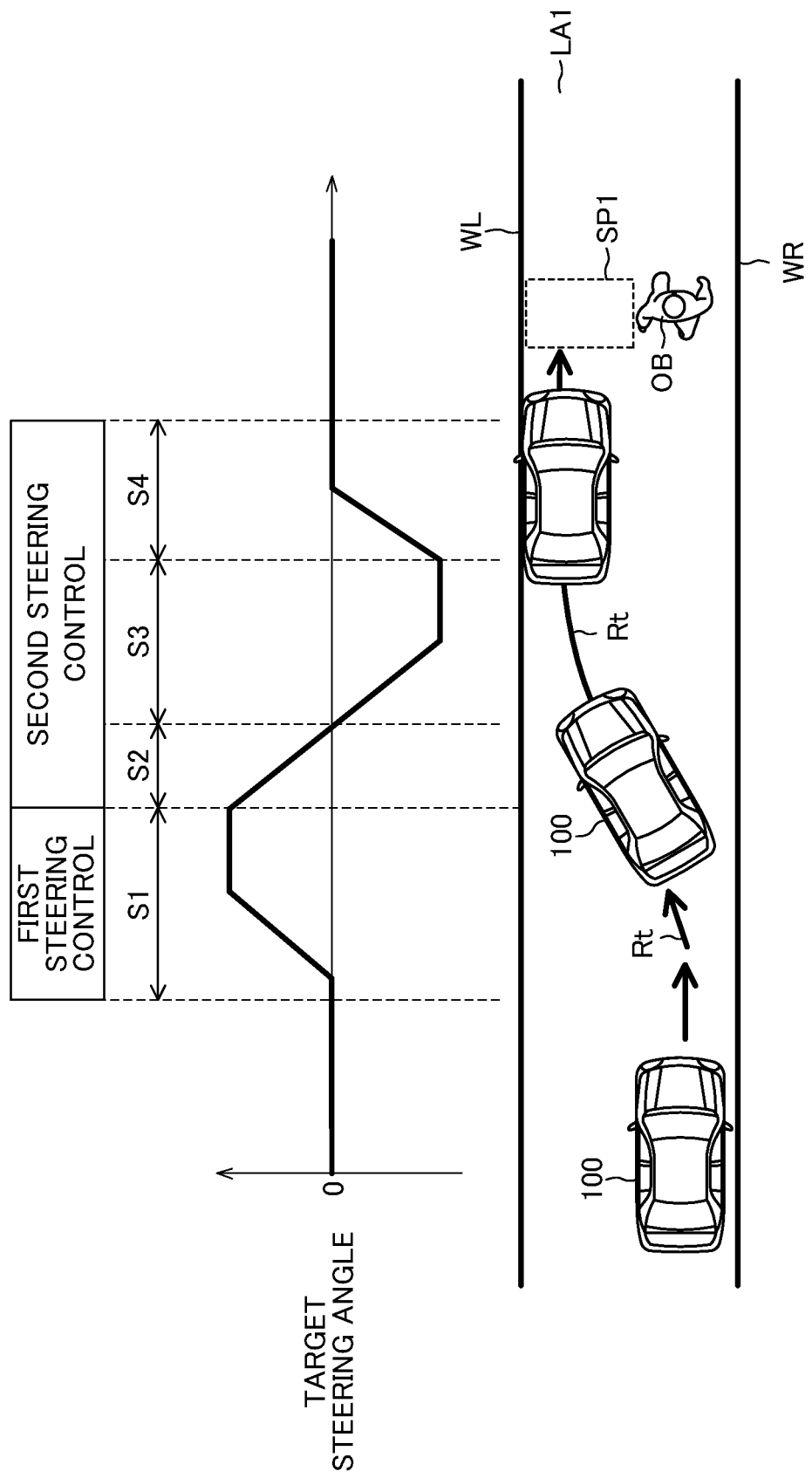
FIG. 2 is a schematic diagram for illustrating an overview of an operation of collision avoidance control in the at least one embodiment.
Figure 3:
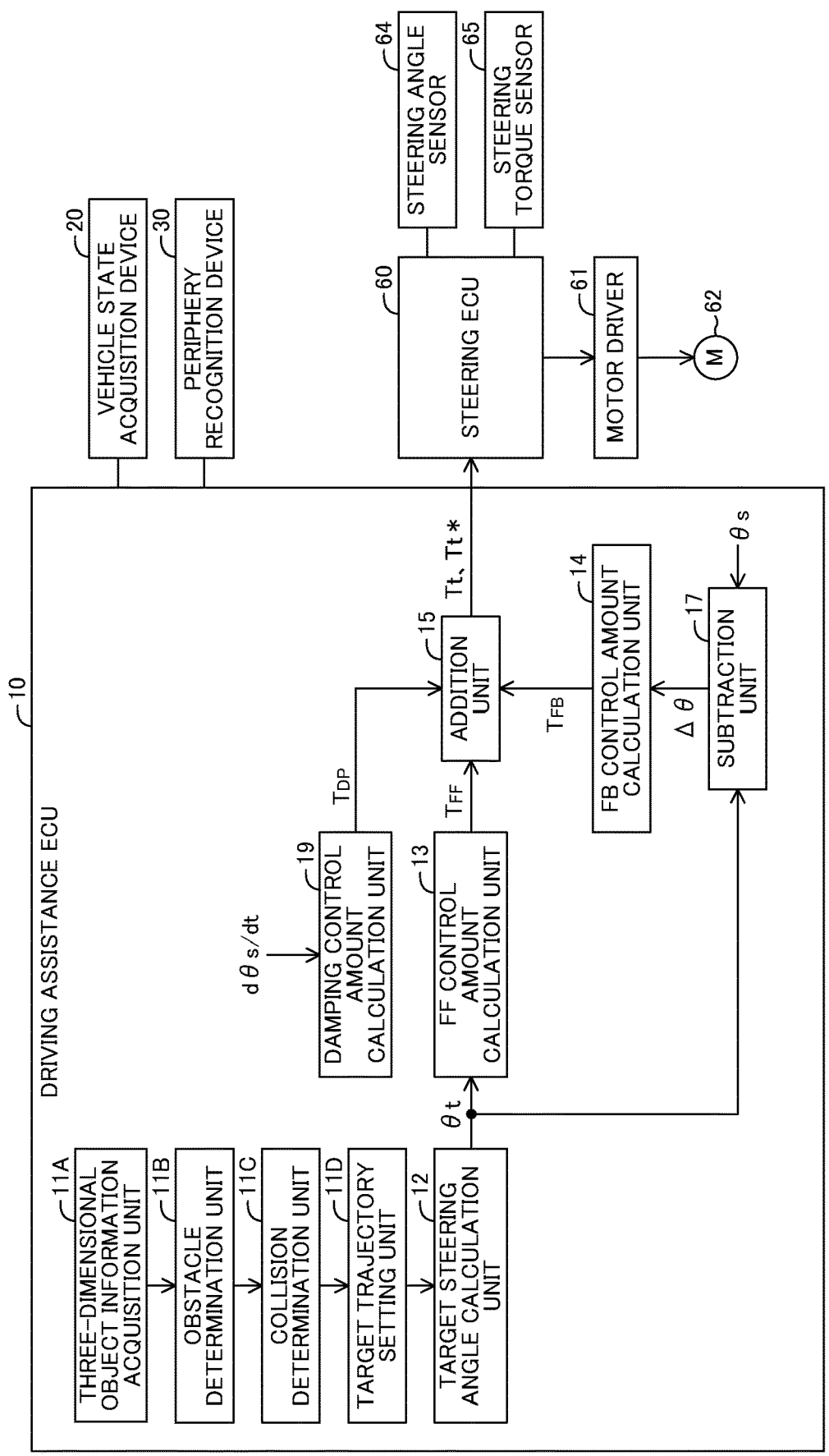
FIG. 3 is a control block diagram of a driving assistance ECU in the at least one embodiment.

Next, referring to FIG. 2 and FIG. 3, an overview of an operation of the collision avoidance control is described. As illustrated in FIG. 2, it is assumed that, when the own vehicle 100 is traveling on a traveling lane LA1, which is, for example, a straight road, there occurs a situation in which an obstacle OB, which is a three-dimensional object (target) and is highly likely to collide with the own vehicle 100, exists. In this case, the driving assistance ECU 10 executes the collision avoidance control of avoiding the collision of the own vehicle 100 with the obstacle OB. The collision avoidance control refers to control of automatically steering the steered wheels of the own vehicle 100 such that the own vehicle 100 avoids the collision with the obstacle OB without deviating from the traveling lane LA1. The automatic steering as used herein is a concept including steering assistance of assisting in the steering operation of the driver such that the own vehicle 100 avoids the collision with the obstacle OB.

Specifically, the driving assistance ECU 10 executes, as the collision avoidance control, "first steering control" for avoiding the collision with the obstacle OB, and then executes "second steering control" for maintaining the own vehicle 100 within the traveling lane LA1. In the first steering control, "first incremental steering" (see a section S1) of incrementing the steering angle from, for example, a neutral position (state in which the steering angle is substantially 0). In the second steering control, there are successively executed "first decremental steering (see a section S2)" of returning the steering angle incremented through the first steering control to the neutral position, "second incremental steering" (see a section S3) of incrementing the steering angle from the neutral position toward an opposite direction of the steering direction of the first steering control, and "second decremental steering" (see a section S4) of again returning the steering to the neutral position.

FIG. 3 is a control block diagram of the driving assistance ECU 10 which executes the collision avoidance control. The driving assistance ECU 10 includes, as a part of function elements, a three-dimensional object information acquisition unit 11A, an obstacle determination unit 11B, a collision determination unit 11C, a target trajectory setting unit 11D, a target steering angle calculation unit 12, an FF control amount calculation unit 13, an FB control amount calculation unit 14, an addition unit 15, a subtraction unit 17, and a damping control amount calculation unit 19. Those functional elements are included in the driving assistance ECU 10 which is integrated hardware in this description, but any part thereof may be provided to another ECU independent of the driving assistance ECU 10. Moreover, all or a part of the functional elements of the driving assistance ECU 10 may be provided in an information processing device installed at a facility (for example, a control center) which can communicate to and from the own vehicle 100.

The three-dimensional object information acquisition unit 11A recognizes, based on position information on a left white line WL and a right white line WR (see FIG. 2) transmitted from the periphery recognition device 30, the traveling lane LA1 partitioned by the left white line WL and the right while line WR. Moreover, the three-dimensional object information acquisition unit 11A determines whether or not three-dimensional objects exist in the region located on the front side and the front lateral sides of the own vehicle 100 based on the target information transmitted from the periphery recognition device 30. When the three-dimensional object information acquisition unit 11A determines that three-dimensional objects exist, the three-dimensional object information acquisition unit 11A generates information on all of the three-dimensional objects determined to exist. Specifically, the three-dimensional object information acquisition unit 11A uses a coordinate system which has a center position at a front end of the own vehicle 100 as an origin, and extends from this origin toward the right direction and the left direction and the front side to generate coordinate information on the three-dimensional objects including position coordinates of each three-dimensional object.

The obstacle determination unit 11B determines whether or not each of all of the three-dimensional objects acquired by the three-dimensional object information acquisition unit 11A is an obstacle OB which is likely to collide with the own vehicle 100. Specifically, the obstacle determination unit 11B calculates a turning radius of the own vehicle 100 based on the vehicle speed V detected by the vehicle speed sensor 21, the yaw rate Yr detected by the IMU 24, and the actual steering angle θs detected by the steering angle sensor 64, and calculates a trajectory of the own vehicle 100 based on this turning radius.

Moreover, the obstacle determination unit 11B calculates a trajectory of each three-dimensional object based on the coordinate information on each three-dimensional object. The obstacle determination unit 11B determines whether or not the own vehicle 100 is likely to collide with any one of the three-dimensional objects when the own vehicle 100 travels while maintaining a current travel state and each three-dimensional object moves while maintaining a current movement state based on the trajectory of the own vehicle 100 and the trajectory of each three-dimensional object. When the three-dimensional object is stationary, the driving assistance ECU 10 executes this determination processing based on the trajectory of the own vehicle 100 and the current position of the three-dimensional object. When the obstacle determination unit 11B determines that the own vehicle 100 is likely to collide with the three-dimensional object based on a result of the determination, the obstacle determination unit 11B determines that this three-dimensional object is an obstacle OB.

The collision determination unit 11C calculates, when the obstacle determination unit 11B determines that the three-dimensional object is an obstacle OB, an estimated time to the collision of the own vehicle 100 with the obstacle OB (time to collision, hereinafter referred to as "TTC") based on a distance L from the vehicle 100 to the obstacle OB and a relative speed Vr of the own vehicle 100 with respect to the obstacle OB. The TTC is an index value which indicates a possibility of the collision of the own vehicle 100 with the obstacle OB. The TTC can be obtained by dividing the distance L from the own vehicle 100 to the obstacle OB by the relative speed Vr (TTC=L/Vr). The collision determination unit 11C determines that the own vehicle 100 is highly likely to collide with the obstacle OB when the TTC is equal to or shorter than a predetermined collision determination threshold value TTCth.

The target trajectory setting unit 11D calculates, when the collision determination unit 11C determines that the own vehicle 100 is highly likely to collide with the obstacle OB, a trajectory which enables the vehicle 100 to avoid the collision with the obstacle OB without interfering therewith through use of a well-known method, and sets the calculated trajectory as a target trajectory Rt (see FIG. 2) (see, for example, Japanese Patent Application Laid-open No. 2017-

43262 and Japanese Patent Application Laid-open No. 2018-106230). In this case, the target trajectory Rt is generated, based on the target information on the obstacle OB and the position of each of the left and right white lines WL and WR, such that the target trajectory Rt passes through a collision avoidance space SP1 set on any one of the left side and the right side of the obstacle OB and is within a range in which the own vehicle 100 does not deviate from the traveling lane LA1.

Specifically, as illustrated in FIG. 2, the target trajectory Rt is set so that the target trajectory Rt is formed of a first steering section S1 in which the first steering control for avoiding the collision between the vehicle 100 and the obstacle OB is executed and a second steering section S2 to a fourth steering section S4 in which the second steering control for maintaining the own vehicle 100 within the traveling lane LA1 is executed. In the first steering section S1, the first incremental steering of the first steering control is executed. In the second steering section S2, the first decremental steering of the second steering control is executed. In the third steering section S3, the second incremental steering of the second steering control is executed. In the fourth steering section S4, the second decremental steering of the second steering control is executed.

The target steering angle calculation unit 12 calculates, when the target trajectory Rt is set by the target trajectory setting unit 11D, the target steering angle θt which achieves the target yaw rate based on the current vehicle speed V of the own vehicle 100 and a target yaw rate required to cause the own vehicle 100 to travel along the target trajectory Rt. The target steering angle calculation unit 12 transmits the calculated target steering angle t to the FF control amount calculation unit 13 and the subtraction unit 17.

The FF control amount calculation unit 13 calculates, based on the target steering angle θt, an FF target steering torque $T_{FF}$ which is a feedforward control amount. For example, the FF control amount calculation unit 13 refers to an FF torque map (not shown) stored in advance based on the target steering angle θt, to thereby calculate the FF target steering torque $T_{FF}$. The FF torque map is set such that as the target steering angle θt increases, the FF target steering torque $T_{FF}$ increases. The calculation of the FF target steering torque $T_{FF}$ is not limited to the method which uses the map, and may be performed based on a calculation equation. The FF control amount calculation unit 13 transmits the calculated FF target steering torque $T_{FF}$ to the addition unit 15.

The subtraction unit 17 calculates, based on the target steering angle θt transmitted from the target steering angle calculation unit 12 and the actual steering angle θs detected by the steering angle sensor 64, a deviation Δθ between the target steering angle θt and the actual steering angle θs. The subtraction unit 17 transmits the calculated deviation Δθ to the FB control amount calculation unit 14.

The FB control amount calculation unit 14 calculates, based on the deviation Δθ, an FB target steering torque $T_{FB}$ which is a feedback control amount. The FB control amount calculation unit 14 uses, for example, a PID control equation, a PI control equation, and a P control equation, each of which includes the deviation Δθ as a proportional term, to calculate the FB target steering torque $T_{FB}$. The FB control amount calculation unit 14 transmits the calculated FB target steering torque $T_{FB}$ to the addition unit 15.

The addition unit 15 adds the FB target steering torque $T_{FB}$ transmitted from the FB control amount calculation unit 14 to the FF target steering torque $T_{FF}$ transmitted from the FF control amount calculation unit 13, to thereby calculate a target steering torque Tt ($=T_{FF}+T_{FB}$). Moreover, to the addition unit 15, a damping torque $T_{DP}$ is transmitted from the damping control amount calculation unit 19 described later. When the addition unit 15 receives the damping torque $T_{DP}$, the addition unit 15 adds the damping torque $T_{DP}$ to the target steering torque Tt, to thereby calculate a corrected target steering torque Tt* ($=T_{FF}+T_{FB}+T_{DP}$). The addition unit 15 transmits the steering command including information representing the target steering torque Tt or the corrected target steering torque Tt* to the steering ECU 60.

When the steering ECU 60 receives the steering command from the driving assistance ECU 10, the steering ECU 60 converts the target steering torque Tt or the corrected target steering torque Tt*, which is the information included in the steering command, to a target current, and controls the operation of the motor driver 61 such that the target current flows through the steering motor 62. To the motor driver 61, a current sensor (not shown) for detecting a current flowing through the steering motor 62 is provided. The steering ECU 60 controls a duty ratio of switching elements (not shown) of the motor driver 61 such that the actual current detected by the current sensor is equal to the target current. As a result, the target steering torque Tt or the corrected target steering torque Tt* is output from the steering motor 62, and the steered wheels of the own vehicle 100 are consequently steered. Consequently, there is achieved the automatic steering of causing the own vehicle 100 to travel along the target trajectory Rt, avoiding the collision of the own vehicle 100 with the obstacle OB, and simultaneously preventing the own vehicle 100 from deviating from the traveling lane LA1.

The damping control amount calculation unit 19 calculates the damping torque $T_{DP}$ which is a steering resistive force toward an opposite direction of that of the target steering torque Tt. In this case, the opposite direction means that when the target steering torque Tt takes a positive value (left turn direction), the damping torque $T_{DP}$ takes a negative value (right turn direction), and when the target steering torque Tt takes a negative value (right turn direction), the damping torque $T_{DP}$ takes a positive value (right turn direction). For example, the damping control amount calculation unit 19 refers to a damping torque map (not shown) stored in advance based on a steering angle speed dθs/dt, to thereby calculate the damping torque $T_{DP}$. It is preferred that the damping torque map be set such that as the steering angle speed dθs/dt increases, the damping torque $T_{DP}$ increases. It is only required that the steering angle speed dθs/dt be obtained by differentiating the actual steering angle θs detected by the steering angle sensor 64 with respect to time. The calculation of the damping torque $T_{DP}$ is not limited to the method which uses the map, and may be performed based on a calculation equation.

The damping control amount calculation unit 19 transmits the calculated damping torque $T_{DP}$ to the addition unit 15. When the addition unit 15 receives the damping torque $T_{DP}$, the addition unit 15 calculates the corrected target steering torque Tt* obtained by adding the damping torque $T_{DP}$ to the target steering torque Tt, and transmits the calculated corrected target steering torque Tt* to the steering ECU 60. The steering ECU 60 controls the operation of the motor driver 61 such that the corrected target steering torque Tt* is output from the steering motor 62. As a result, there is achieved damping control of applying the damping torque during the collision avoidance control. When the damping torque is applied, an upper limit may be set to a change amount of the damping torque per unit time in order to suppress sudden torque fluctuation.

In the at least one embodiment, the damping control amount calculation unit 19 operates not to calculate the damping torque $T_{DP}$ during the execution of the first steering control, and operates to calculate the damping torque $T_{DP}$ and to transmit the damping torque $T_{DP}$ to the addition unit 15 only during the execution of the second steering control. That is, the damping control amount calculation unit 19 is configured to apply the damping torque $T_{DP}$ only during the execution of the second steering control.

Figure 8:
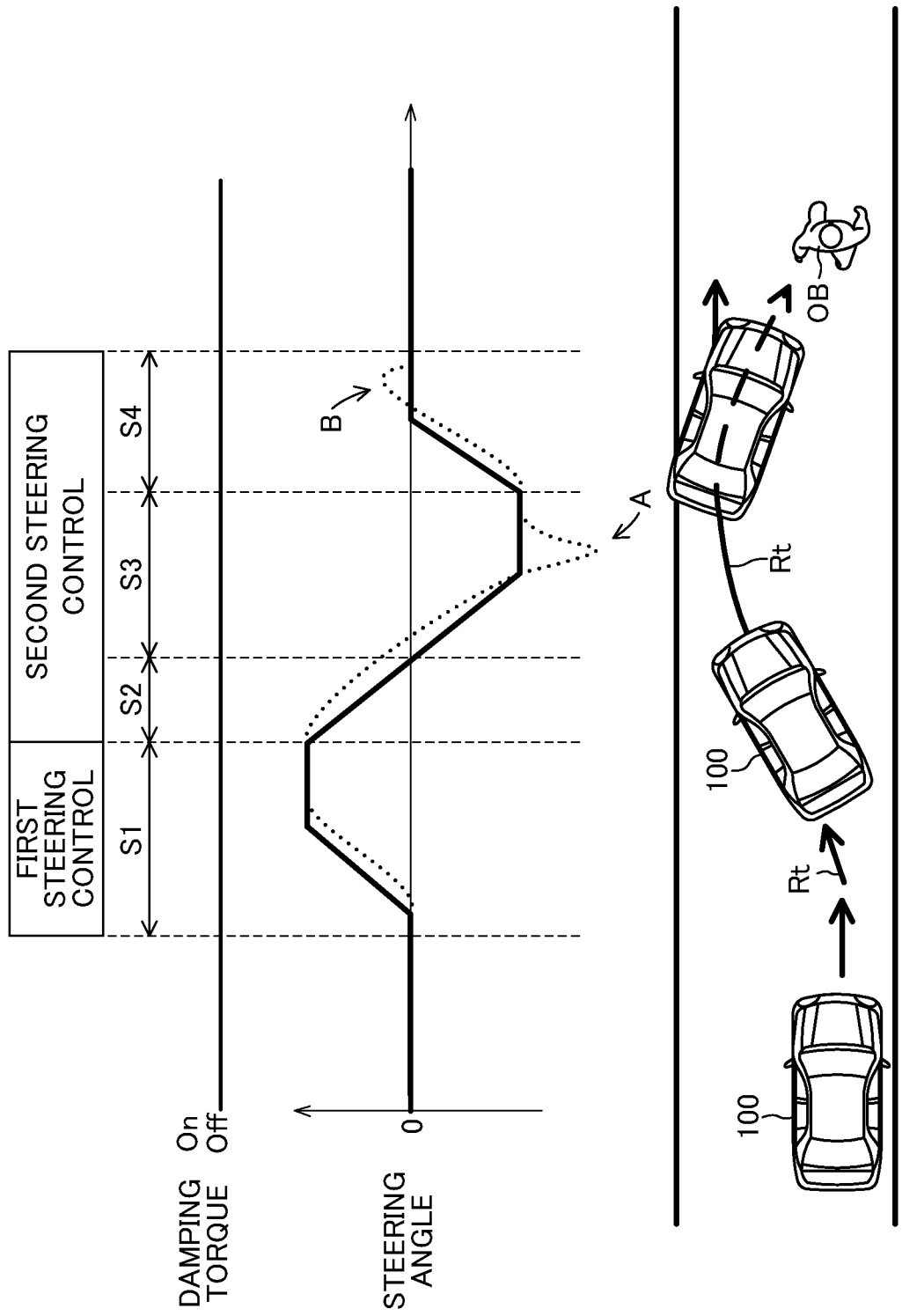
FIG. 8 is a schematic diagram for illustrating collision avoidance control in a comparative example.
Figure 9:
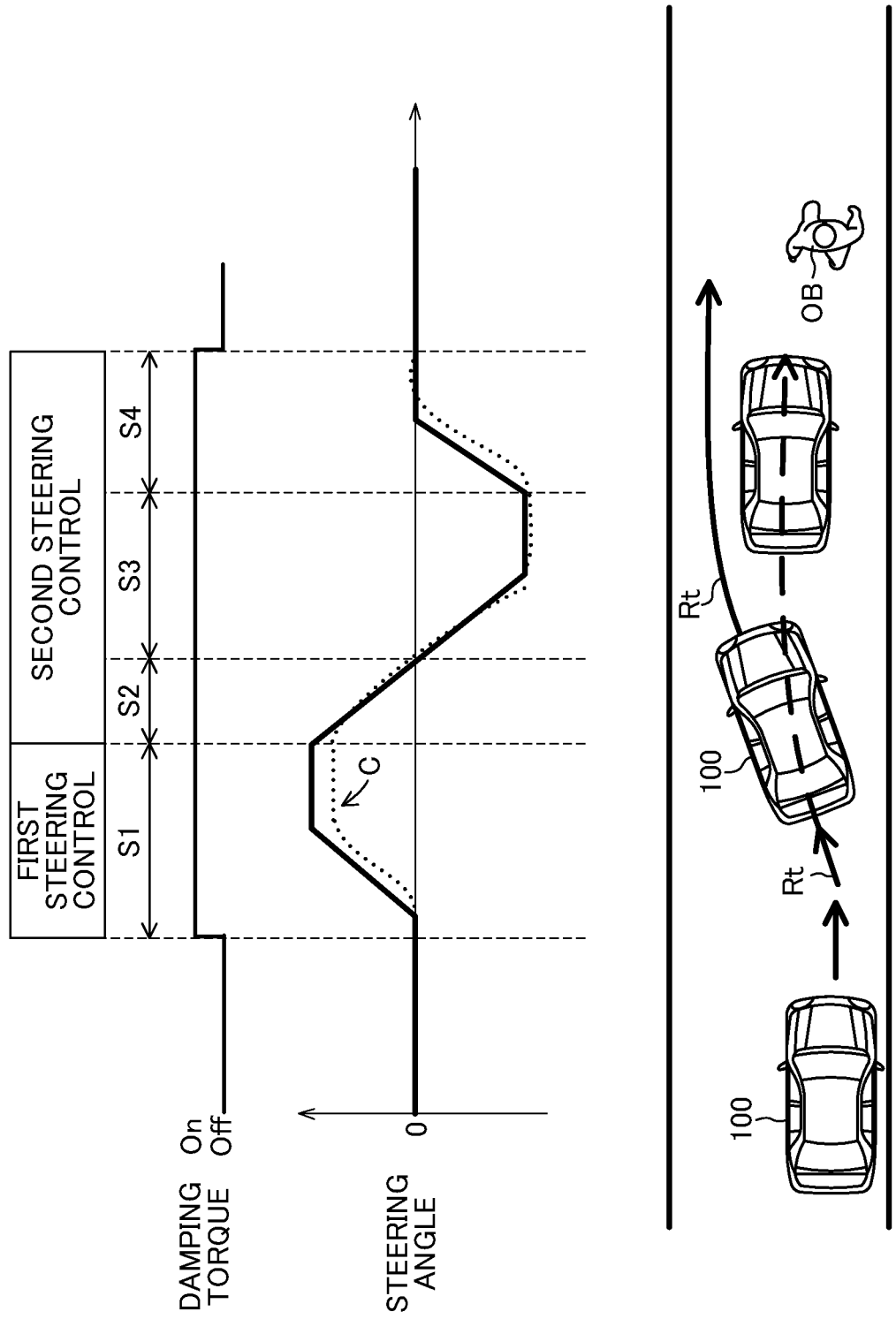
FIG. 9 is a schematic diagram for illustrating collision avoidance control in a comparative example.

Description is now given of a reason for the damping torque being applied to only the second steering control. FIG. 8 is a diagram for illustrating a case in which the damping torque is applied to none of the first steering control and the second steering control. FIG. 9 is a diagram for illustrating a case in which the damping torque is applied to both of the first steering control and the second steering control.

As illustrated in FIG. 8, when the damping torque is applied to none of the first steering control and the second steering control, a self-aligning torque in the decremental direction which was generated in the steered wheels of the vehicle 100 during the execution of the first steering control is added to the first decremental steering (section S2) and the second incremental steering (section S3) of the second steering control. As a result, there is caused an overshoot (see "A" of FIG. 8) in which the incremental steering (section S3) of the second steering control is excessive in steering angle, and there occurs a problem in that the trajectory of the vehicle 100 is directed toward the obstacle OB. Moreover, also in the second decremental steering (section S4) of the second steering control, a self-aligning torque which was generated in the steered wheels during the execution of the second incremental steering (section S3) is added, and there occurs a problem in that an overshoot (see "B" of FIG. 8) is caused.

In contrast, as illustrated in FIG. 9, when the damping torque is applied to both of the first steering control and the second steering control, the overshoots of the second steering control can be suppressed. However, when the damping torque is also applied to the first steering control, the steering angle of the first incremental steering (section S1) becomes insufficient (see "C" of FIG. 9). As a result, there occurs a problem in that the collision between the own vehicle 100 and the obstacle OB cannot reliably be avoided.

That is, when the damping torque is not applied to the first steering control, and is applied to only the second steering control, the deficiency in steering angle of the first steering control executed to avoid the collision with the obstacle OB is suppressed, and the excess in steering angle (overshoots) of the second steering control executed to maintain the own vehicle 100 within the traveling lane LA1 can be prevented. The driving assistance ECU 10 in the at least one embodiment of the present disclosure applies the damping torque to only the second steering control for this reason.

Figure 4:
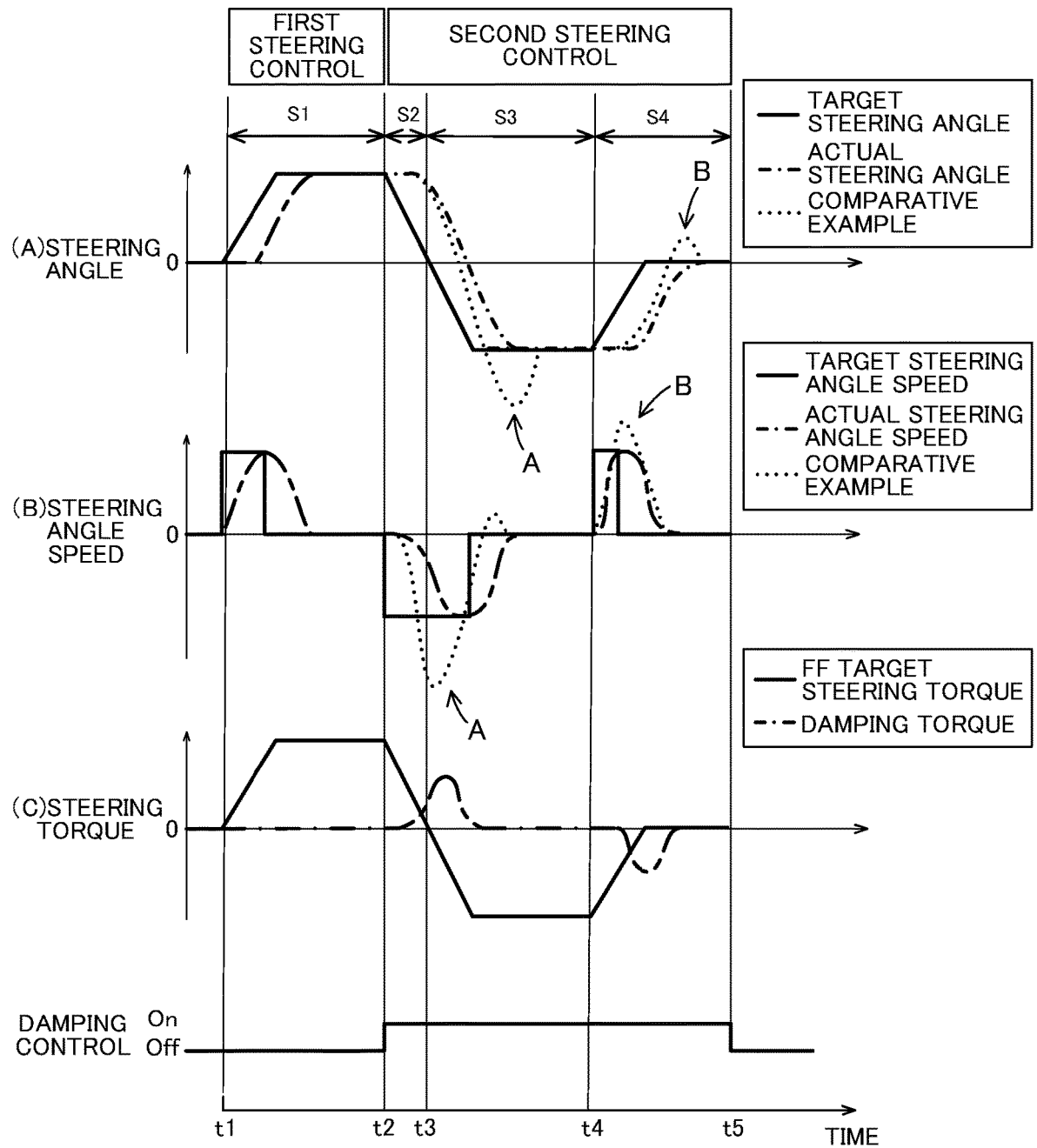
FIG. 4 is a timing chart for illustrating a flow of specific processing of first steering control, second steering control, and damping control in the at least one embodiment.

Now, referring to a timing chart of FIG. 4, description is given of a flow of specific processing of the first steering control, the second steering control, and the damping control.

In "(A) steering angle" of FIG. 4, the solid line represents the target steering angle in the at least one embodiment of the present disclosure, the one-dot chain line represents the actual steering angle in the at least one embodiment of the present disclosure, and the broken line represents the actual steering angle in a comparative example in which the damping torque is not applied. Moreover, in "(B) steering angle speed" of FIG. 4, the solid line represents the target steering angle speed in the at least one embodiment of the present disclosure, the one-dot chain line represents an actual steering angle speed in the at least one embodiment of the present disclosure, and the broken line represents the actual steering angle speed in the comparative example in which the damping torque is not applied. Further, in "(C) steering torque" of FIG. 4, the solid line represents the FF target steering torque in the at least one embodiment of the present disclosure, and the one-dot chain line represents the damping torque in the at least one embodiment of the present disclosure. In the example of FIG. 4, the own vehicle 100 avoids the collision with the obstacle OB through left turn steering. When the collision is avoided through right turn steering, only the signs of the steering angle, the steering angle speed, and the steering torque are inverted, and hence description is hereinafter omitted.

It is assumed that, at a time t1 of FIG. 4, the TTC decreases to a value equal to or shorter than the predetermined collision determination threshold value TTCth. When the TTC becomes equal to or shorter than the collision determination threshold value TTCth, the driving assistance ECU 10 starts, from the time t1, the first steering control for avoiding the collision between the own vehicle 100 and the obstacle OB. Specifically, the driving assistance ECU 10 starts the first incremental steering (see the section S1) of incrementing the steering angle from the neutral position (steering angle is substantially 0°). The damping control is maintained OFF (invalid) until the first steering control is finished at a time t2. That is, the damping control is not executed during the execution of the first steering control. As a result, the deficiency in steering angle of the first steering control can be suppressed.

When a predetermined finish condition is satisfied at the time t2, and hence the first steering control is finished, the driving assistance ECU 10 starts the second steering control for maintaining the own vehicle 100 within the traveling lane LA1. It is only required to set, based on, for example, a profile of the steering angle obtained from the FF target steering torque $T_{FF}$, an end point of the first steering control to a point at which the value of the steering angle starts to gradually decrease from the maximum value. When the driving assistance ECU 10 finishes the first steering control, the driving assistance ECU 10 executes, from the time t2, the first decremental steering (see the section S2) of returning the steering angle to the neutral position. Moreover, the driving assistance ECU 10 switches, at the time t2, the damping control from OFF (invalid) to ON (valid) simultaneously with the start of the second steering control.

When the driving assistance ECU 10 finishes the first decremental steering of the second steering control at a time t3, the driving assistance ECU 10 executes the second incremental steering (see the section S3) of incrementing the steering angle from the neutral position toward the opposite direction of the steering direction of the first steering control over a period from the time t3 to a time t4. When the actual steering angle speed increases due to the second decremental steering started from the time t2, the damping torque corresponding to the increase in actual steering angle speed is applied to the first decremental steering (see the section S2) and the second incremental steering (see the section S3). That is, the damping torque is applied in the direction of canceling the self-aligning torque which was generated in the steered wheels during the execution of the first steering control. As a result, the excess in steering angle (see "A" of FIG. 4) of the second incremental steering which occurs in the comparative example can be prevented, and hence the overshoot can effectively be suppressed.

When the driving assistance ECU 10 finishes the second incremental steering of the second steering control at the time t4, the driving assistance ECU 10 executes the second decremental steering (see the section S4) of again returning the steering angle to the neutral position over a period from the time t4 to a time t5. When the actual steering angle speed increases due to the second decremental steering started from the time t4, the damping torque corresponding to the increase in actual steering angle speed is applied to the second decremental steering. That is, the damping torque is applied in the direction of canceling the self-aligning torque which was generated in the steered wheels during the execution of the first decremental steering and the second incremental steering (see the section S2 and the section S3). As a result, the excess in steering angle (see "B" of FIG. 4) of the second decremental steering which occurs in the comparative example can be prevented, and hence the overshoot can effectively be suppressed.

When a predetermined finish condition is satisfied at the time t5, and hence the second steering control is finished, the driving assistance ECU 10 switches the damping control from ON (valid) to OFF (invalid), to thereby finish the collision avoidance control. It is only required that the second steering control be finished, for example, when the yaw angle of the vehicle 100 is substantially parallel with the traveling lane LA1 (white lines WL and WR) or when the actual steering angle θs falls within a predetermined angle range.

Figure 5:
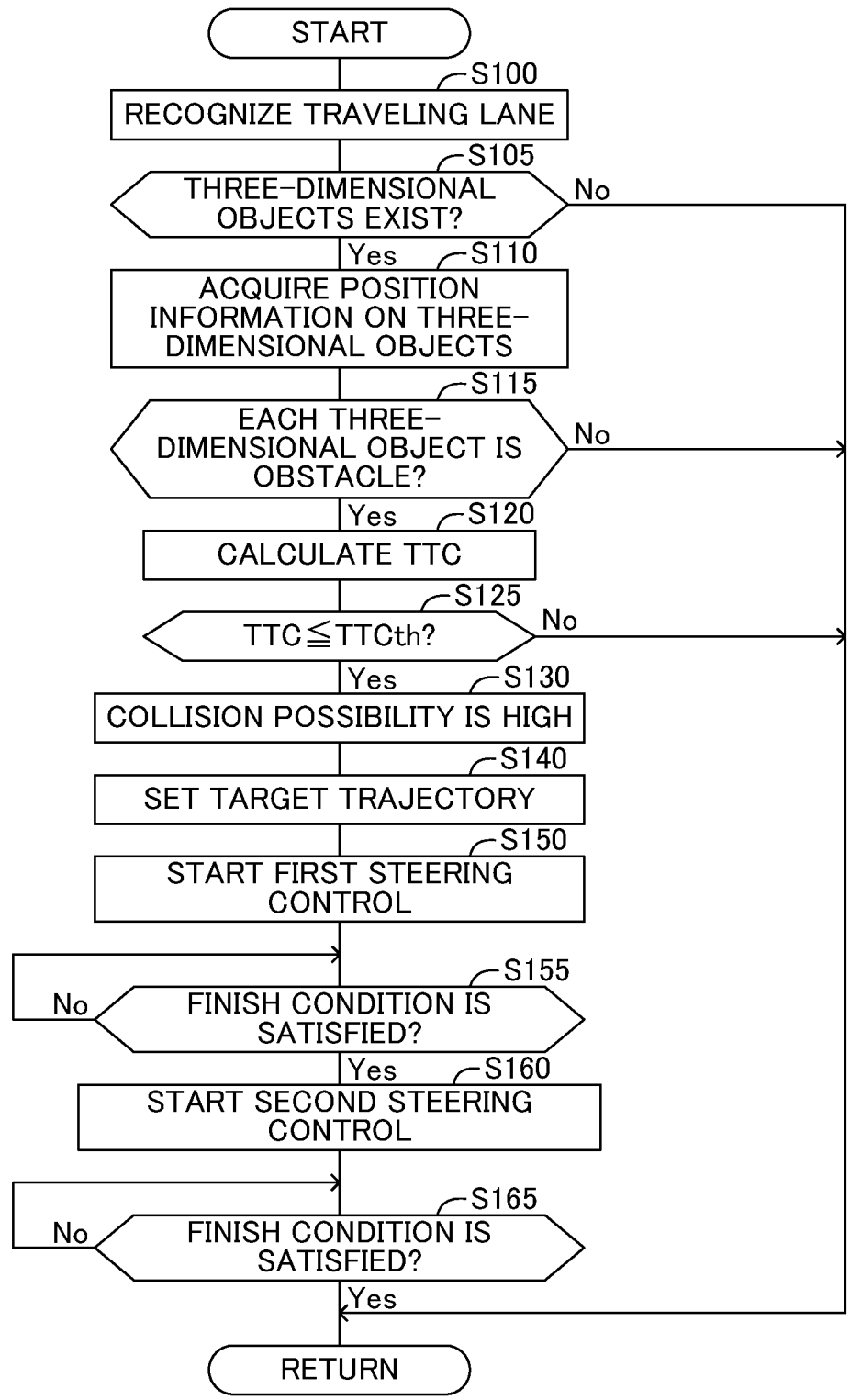
FIG. 5 is a flowchart for illustrating a routine of processing for the collision avoidance control in the at least one embodiment.

Now, referring to a flowchart of FIG. 5, description is given of a routine of processing of the collision avoidance control executed by the driving assistance ECU 10. The driving assistance ECU 10 repeatedly executes processing steps of Step S100 and subsequent steps of FIG. 5 at a predetermined cycle during the travel of the vehicle 100.

In Step S100, the driving assistance ECU 10 recognizes the traveling lane LA1 partitioned by the left white line WL and the right while line WR based on the position information on the left white line WL and the right white line WR transmitted from the periphery recognition device 30.

After that, in Step S105, the driving assistance ECU 10 determines whether or not three-dimensional objects exist in the region located on the front side and the front lateral sides of the own vehicle 100 based on the target information transmitted from the periphery recognition device 30. When three-dimensional objects exist (Yes), the driving assistance ECU 10 advances the process to Step S110. Meanwhile, when three-dimensional objects do not exist (No), the driving assistance ECU 10 temporarily finishes this routine (returns).

In Step S110, the driving assistance ECU 10 acquires the position information on the three-dimensional objects. After that, in Step S115, the driving assistance ECU 10 determines whether or not each three-dimensional object is an obstacle OB which is likely to collide with the own vehicle 100. When the own vehicle 100 is likely to collide with the three-dimensional object, the driving assistance ECU 10 determines that this three-dimensional object is an obstacle OB. When the driving assistance ECU 10 determines that the three-dimensional object is an obstacle OB (Yes), the driving assistance ECU 10 advances the process to Step S120. Meanwhile, when the driving assistance ECU 10 determines that the three-dimensional object is not an obstacle OB (No), the driving assistance ECU 10 temporarily finishes this routine (returns).

In Step S120, the driving assistance ECU 10 calculates the TTC. After that, in Step S125, the driving assistance ECU 10 determines whether or not the TTC is equal to or shorter than the predetermined collision determination threshold value TTCth. When the TTC is equal to or shorter than the collision determination threshold value TTCth (Yes), the driving assistance ECU 10 advances the process to Step S130. Meanwhile, when the TTC is not equal to or shorter than the collision determination threshold value TTCth (No), the driving assistance ECU 10 temporarily finishes this routine (returns).

In Step S130, the driving assistance ECU 10 determines that the own vehicle 100 is highly likely to collide with the obstacle OB. After that, in Step S140, the driving assistance ECU 10 sets the target trajectory Rt which enables the own vehicle 100 to avoid the collision with the obstacle OB without deviating from the traveling lane LA1, and advances the process to Step S150. When the above-mentioned collision avoidance space SP1 (see FIG. 2) does not exist, and hence the driving assistance ECU 10 cannot set the target trajectory Rt, it is only required for the driving assistance ECU 10 to execute the collision avoidance control through braking control, which is not described in detail.

In Step S150, the driving assistance ECU 10 starts the first steering control of executing the first incremental steering which increases the steering angle of the own vehicle 100 such that the own vehicle 100 avoids the obstacle OB while traveling along the target trajectory Rt. In Step S155, when the finish condition for the first steering control is satisfied, the driving assistance ECU 10 advances the process to Step S160.

In Step S160, the driving assistance ECU 10 starts the second steering control of increasing and decreasing the steering angle of the own vehicle 100 such that the own vehicle 100 is maintained within the traveling lane LA1 while traveling along the target trajectory Rt. Specifically, the first decremental steering of returning the steering angle incremented through the first steering control to the neutral position, the second incremental steering of incrementing the steering angle from the neutral position toward the opposite direction of the steering direction of the first steering control, and the second decremental steering of returning again the steering angle to the neutral position are successively executed. In Step S165, when the finish condition for the second steering control is satisfied, the driving assistance ECU 10 temporarily finishes this routine (returns).

Figure 6:
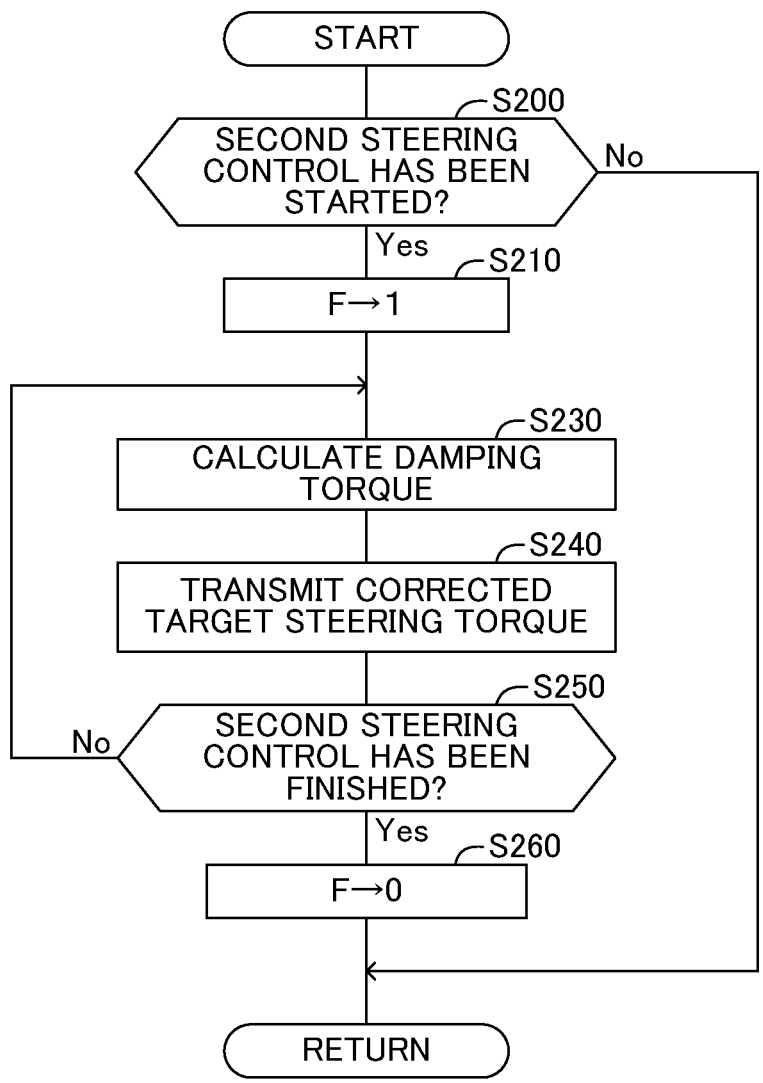
FIG. 6 is a flowchart for illustrating a routine of processing for the damping control in the at least one embodiment.

Next, referring to a flowchart of FIG. 6, description is given of a routine of processing of the damping control executed by the driving assistance ECU 10. The driving assistance ECU 10 repeatedly executes the damping control of FIG. 6 in parallel with the routine of FIG. 5 during the travel of the vehicle 100. Moreover, it is assumed that a flag F which is used to execute the damping control is set to OFF (F=0) at the start of the routine of FIG. 6.

In Step S200, the driving assistance ECU 10 determines whether or not the second steering control has been started. When the second steering control has been started (Yes), the driving assistance ECU 10 advances the process to Step S210. Meanwhile, when the second steering control has not been started (No), the driving assistance ECU 10 temporarily finishes this routine (returns).

In Step S210, the driving assistance ECU 10 sets the flag F which is used to validate the damping control to ON (F=1).

In Step S230, the driving assistance ECU 10 calculates the damping torque $T_{DP}$ based on the steering angle speed dθs/dt obtained by differentiating, with respect to time, the actual steering angle θs detected by the steering angle sensor 64. After that, in Step S240, the driving assistance ECU 10 transmits, to the steering ECU 60, the corrected target steering torque Tt* obtained by adding the damping torque $T_{DP}$ to the target steering torque Tt. That is, the steering motor 62 is controlled such that the steering motor 62 outputs the corrected target steering torque Tt*.

In Step S250, the driving assistance ECU 10 determines whether or not the second steering control has been finished. When the second steering control has been finished (Yes), the driving assistance ECU 10 advances the process to Step S260. Meanwhile, when the second steering control has not been finished (No), the driving assistance ECU 10 returns the process to the determination processing of Step S220.

In Step S260, the driving assistance ECU 10 sets the flag F which is used to validate the damping control to OFF (F=0), and finishes the damping control (returns). The driving assistance ECU 10 subsequently repeatedly executes the processing steps of Step S200 to Step S260 described above in parallel with the routine of FIG. 5 until the vehicle 100 stops.

As described in detail above, the driving assistance ECU 10 in the at least one embodiment sets, when an obstacle OB which is highly likely to collide with the own vehicle 100 is detected in the region located on the front side and the front lateral sides of the own vehicle 100, the target trajectory Rt which allows the own vehicle 100 to avoid the collision with the obstacle OB without deviating from the traveling lane LA1, and executes the collision avoidance control of controlling the steering angle of the steered wheels of the own vehicle 100 such that the own vehicle 100 travels along the target trajectory Rt. The driving assistance ECU 10 successively executes, as the automatic steering, the first steering control of incrementing the steering angle in order to avoid the collision between the own vehicle 100 and the obstacle OB and the second steering control which includes the decremental steering of reducing the steering angle in order to prevent the own vehicle 100 from deviating from the traveling lane LA1. Moreover, the driving assistance ECU 10 executes, during the execution of the automatic steering, the damping control of calculating the damping torque $T_{DP}$ based on the steering angle speed dθs/dt, and applying the calculated damping torque $T_{DP}$ to the target steering torque Tt. In this case, the driving assistance ECU 10 is configured to avoid executing the damping control during the execution of the first steering control, and to execute the damping control only during the execution of the second steering control.

As a result, it is possible to reliably suppress the occurrence of the deficiency in steering angle due to the application of the damping torque in the first steering control. That is, it is possible to effectively prevent the own vehicle 100 from colliding with the obstacle OB due to the deficiency in steering angle of the first steering control. Moreover, in the second steering control, the damping torque is applied toward the direction of canceling the self-aligning torque, thereby being capable of reliably suppressing the overshoots of the steering due to the excess in steering angle. That is, it is possible to effectively prevent the trajectory of the own vehicle 100 from being directed toward the obstacle OB due to the overshoots of the second steering control. As described above, in brief, according to the at least one embodiment, it is possible to simultaneously achieve the suppression of the deficiency in steering angle of the first steering control of avoiding the collision with the obstacle OB and the suppression of the excess in steering angle of the second steering control of maintaining the own vehicle 100 within the traveling lane LA1.

Others

In the above, the driving assistance device, the driving assistance method, and the program according to the at least one embodiment have been described, but the present disclosure is not limited to the above-mentioned at least one embodiment, and various modifications are possible within the range not departing from the object of the present disclosure.

MODIFICATION EXAMPLE

For example, the damping control may be configured to be started when the steering angle speed dθs/dt reaches a predetermined threshold speed after the start of the second steering control. A routine of specific processing is illustrated in a flowchart of FIG. 7. Each step of processing of the routine of FIG. 7 except for Step S220 is a processing step basically equivalent to a corresponding step of processing of FIG. 6, and hence description of those steps is omitted.

Figure 7:
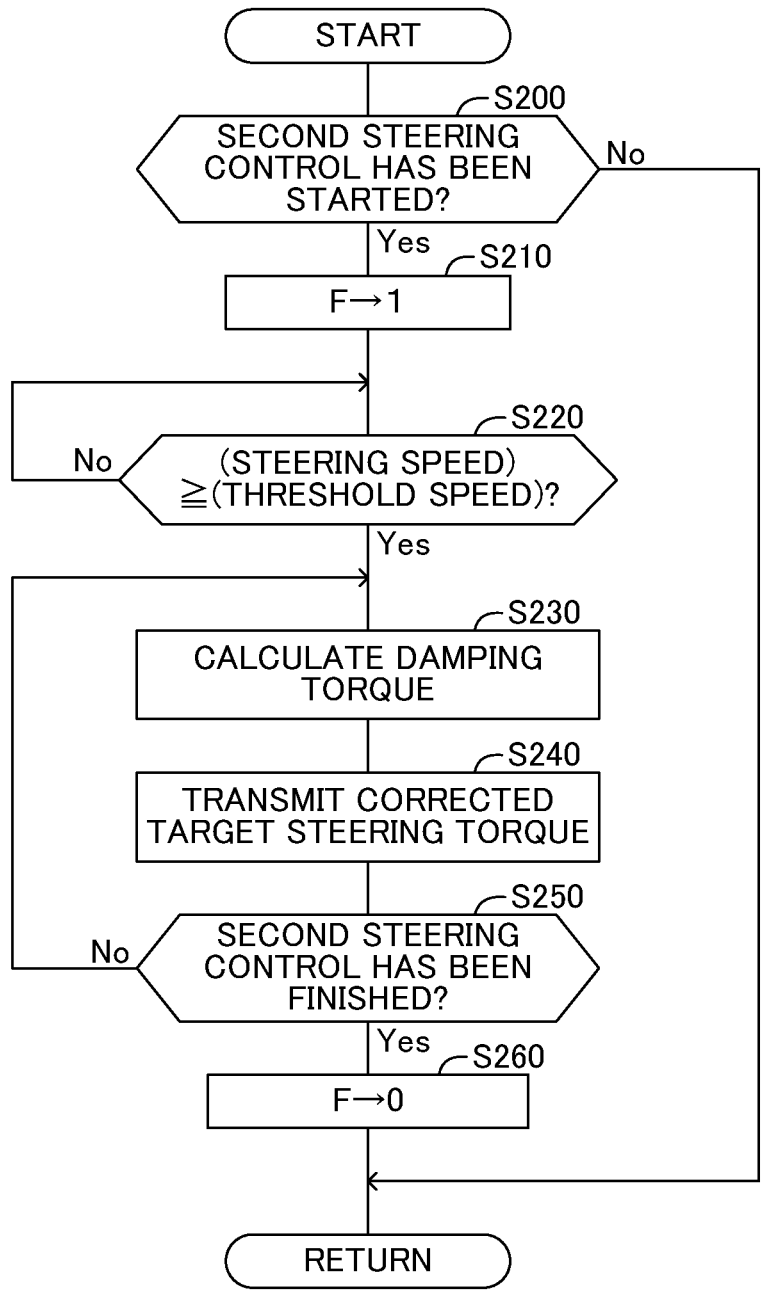
FIG. 7 is a flowchart for illustrating a routine of processing for the damping control in a modification example.

As illustrated in FIG. 7, after the driving assistance ECU 10 sets the flag F which is used to validate the damping control to ON (F=1) in Step S210, the driving assistance ECU 10 determines whether or not the steering angle speed dθ/dt reaches the predetermined threshold speed in Step S220. When the determination is affirmative (Yes), the driving assistance ECU 10 advances the process to Step S230. When the determination is negative (No), the driving assistance ECU 10 returns the process to the determination processing of Step S220. As described above, it is possible to reliably prevent, by starting the damping control after the steering angle speed dθs/dt reaches a speed equal to or higher than the predetermined threshold speed, the damping torque from being applied before the second steering control responds, and hence it is possible to effectively suppress deterioration of responsiveness of the second steering control.

What is claimed is:

1. A driving assistance device for executing collision avoidance control of controlling, when an obstacle which is highly likely to collide with an own vehicle is detected in a region located on a front side and front lateral sides of the own vehicle, a steering angle of a steered wheel of the own vehicle so that the own vehicle travels along a target trajectory which enables the own vehicle to avoid the collision with the obstacle without deviating from a traveling lane, the driving assistance device comprising:
   a steering control unit configured to execute, in order to avoid the collision between the own vehicle and the obstacle, first steering control being incremental steering of increasing the steering angle, and to execute second steering control including decremental steering of reducing the steering angle in order to prevent the deviation of the own vehicle from the traveling lane after the execution of the first steering control; and
   a damping control unit configured to execute damping control of calculating a steering resistive force based on a steering angle speed during the execution of the collision avoidance control, and applying the calculated steering resistive force to the steered wheel,
   wherein the damping control unit is configured to avoid executing the damping control during the execution of the first steering control, and to execute the damping control during the execution of the second steering control.

2. The driving assistance device according to claim 1, wherein the damping control unit is configured to start the damping control when the steering angle speed becomes equal to or higher than a predetermined threshold speed during the execution of the second steering control.

3. A driving assistance method of executing collision avoidance control of controlling, when an obstacle which is highly likely to collide with an own vehicle is detected in a region located on a front side and front lateral sides of the own vehicle, a steering angle of a steered wheel of the own vehicle so that the own vehicle travels along a target trajectory which enables the own vehicle to avoid the collision with the obstacle without deviating from a traveling lane, the driving assistance method comprising:

executing, in order to avoid the collision between the own vehicle and the obstacle, first steering control being incremental steering of increasing the steering angle, and executing second steering control including decremental steering of reducing the steering angle in order to prevent the deviation of the own vehicle from the traveling lane after the execution of the first steering control;

executing damping control of calculating a steering resistive force based on a steering angle speed during the execution of the collision avoidance control, and applying the calculated steering resistive force to the steered wheel; and avoiding executing the damping control during the execution of the first steering control, and executing the damping control during the execution of the second steering control.

4. A program for causing a computer of a driving assistance device for executing collision avoidance control of controlling, when an obstacle which is highly likely to collide with an own vehicle is detected in a region located on a front side and front lateral sides of the own vehicle, a steering angle of a steered wheel of the own vehicle so that the own vehicle travels along a target trajectory which enables the own vehicle to avoid the collision with the obstacle without deviating from a traveling lane, to execute the processes of:

executing, in order to avoid the collision between the own vehicle and the obstacle, first steering control being incremental steering of increasing the steering angle, and executing second steering control including decremental steering of reducing the steering angle in order to prevent the deviation of the own vehicle from the traveling lane after the execution of the first steering control;

executing damping control of calculating a steering resistive force based on a steering angle speed during the execution of the collision avoidance control, and applying the calculated steering resistive force to the steered wheel; and avoiding executing the damping control during the execution of the first steering control, and executing the damping control during the execution of the second steering control.

* * * * *